United States Patent [19]

Huckestein

[11] Patent Number: 4,615,862
[45] Date of Patent: Oct. 7, 1986

[54] NUCLEAR REACTOR WITH FUEL ASSEMBLY SUPPORT MEANS

[75] Inventor: Edgar A. Huckestein, Pittsburgh, Pa.

[73] Assignee: Westinghouse Electric Corp., Pittsburgh, Pa.

[21] Appl. No.: 563,896

[22] Filed: Dec. 21, 1983

[51] Int. Cl.$^4$ ............................................... G21C 3/32
[52] U.S. Cl. ..................................... 376/362; 376/446
[58] Field of Search .............. 376/364, 362, 446, 448, 376/463

[56] References Cited

U.S. PATENT DOCUMENTS

| 2,780,596 | 2/1957 | Anderson | 376/362 |
| 3,971,575 | 7/1976 | Lesham et al. | 376/364 X |
| 4,344,914 | 8/1982 | Rosa | 376/446 X |

FOREIGN PATENT DOCUMENTS 85993  5/1984  Japan .................................. 376/463

OTHER PUBLICATIONS

Roberts, E. et al., "Westinghouse PWR Fuel Development and Performance", Nuclear Energy, vol. 19, No. 5, (Oct.), 335–346.

Primary Examiner—Stephen C. Bentley
Assistant Examiner—John S. Maples, Jr.
Attorney, Agent, or Firm—Daniel C. Abeles

[57] ABSTRACT

A nuclear reactor in which the bottom nozzle of each fuel assembly is a casting having leg-like pins which are cast as part of the bottom nozzle. The pins extend from the corners of the bottom nozzle of each fuel assembly. The transverse cross section of each pin has the shape of a circular sector whose arc depends on the number of apeces of the bottom nozzle, typically 90° for a square nozzle and 120° for a hexagonal nozzle. The fuel assemblies are mutually nested side-by-side so that a group of contiguous pins extends from each region where corners of fuel elements converge. The sides of the pins of each group are in engagement so that the pins of the group form a continuous circularly cylindrical surface. The core support plate has a plurality of holes. The boundaries of the holes are circular cylinders. Each group of pins extend into a hole in the core support plate. The holes and the pins are so dimensioned that the cylindrical body formed by each group of pins is a snug sliding fit in the corresponding hole. The fuel assemblies are thus effectively positioned, supported and aligned.

6 Claims, 15 Drawing Figures

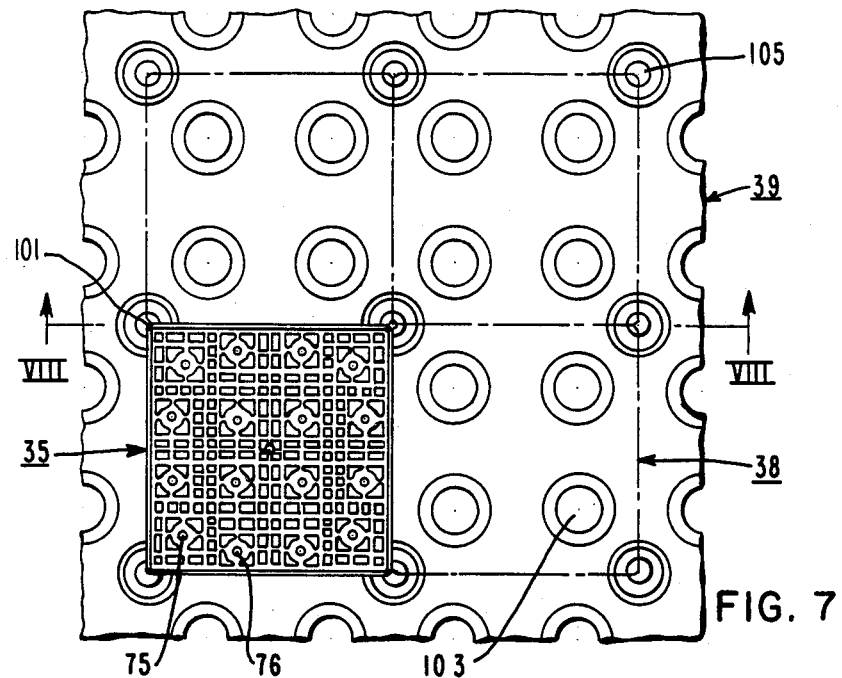
FIG. 7
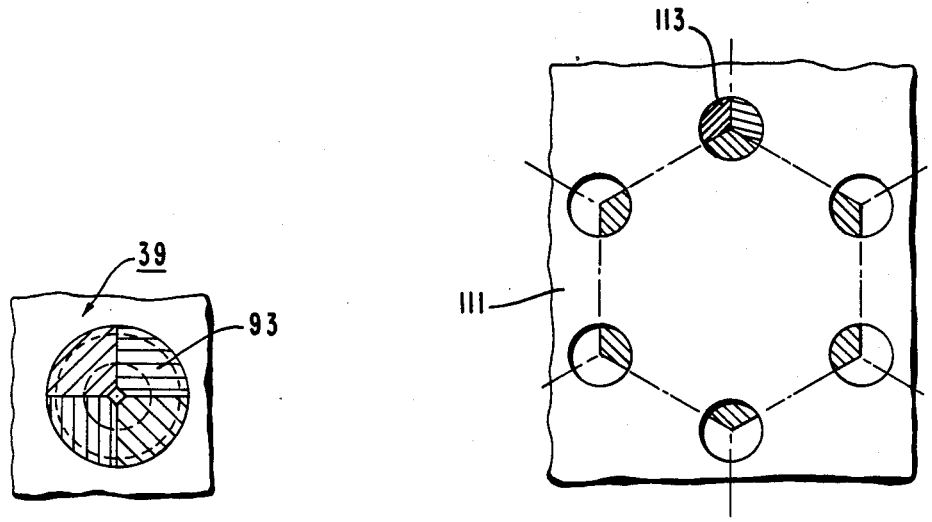
FIG. 12
FIG. 13

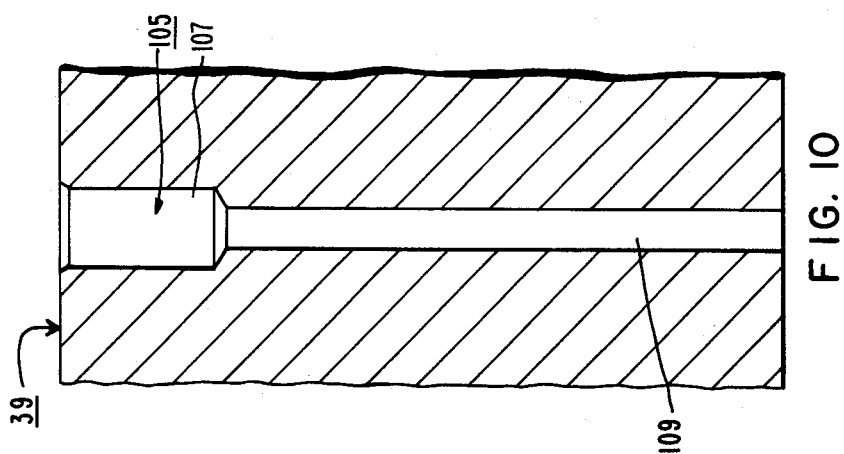
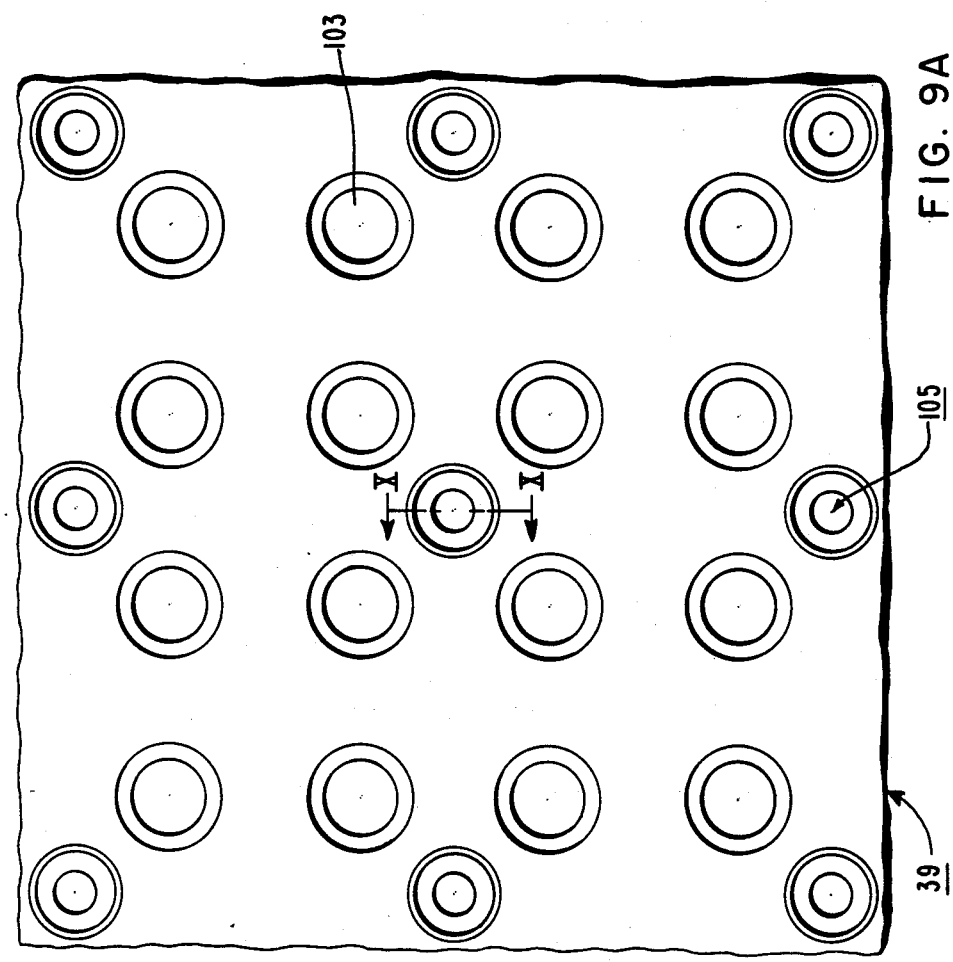

NUCLEAR REACTOR WITH FUEL ASSEMBLY SUPPORT MEANS

BACKGROUND OF THE INVENTION

This invention relates to nuclear reactors. It has particular relationship to the structure of the core and core support of a nuclear reactor. The core of a nuclear reactor includes a plurality of fuel assemblies. Each assembly is an elongated member of generally polygonal transverse cross section. Typically, the cross section may be square or rectangular, the fuel assembly having the form of a square or rectangular parallelopiped. The cross section may also be hexagonal. In forming the core, the fuel assemblies are mounted or nested side-by-side in an array. It is essential that the fuel assemblies be precisely positioned and aligned and firmly supported in such a way that the positioning and alignment is maintained under the condiserable forces exerted by the coolant during operation and notwithstanding the extensive temperature variations which occur during operation.

A description of the typical prior art is presented in Anthony, U.S. Pat. No. 4,192,716. In nuclear reactors prior to Anthony, pins were provided in the core support plate and holes in each fuel assembly or pins were provided in the each fuel assembly and holes in the core support plate. In either structure, the fuel assemblies were mounted with each pin in a fuel assembly on the support plate in a hole in the support plate or fuel assembly as the case may be. Anthony describes some of the difficulties and drawbacks of this structure. Difficulty of manufacture and cost are important factors. There are 192 fuel assemblies in a typical reactor and two alignment pins in, or for, each assembly. To provide each of the 384 pins, the pin-receiving member must be drilled and tapped and threaded pins must be screwed into the tapped holes. An important difficulty not mentioned by Anthony is that the pins do not position and align the fuel assemblies as effectively as is necessary to assure that they may maintain their position and alignment.

Anthony proposes to provide pins in the core support plate and depressions in the corners of the lower end fittings of each fuel assembly, each corner engaging a quarter of a pin, where the fuel assemblies are of square transverse cross section. The disadvantages of this structure is that the pins may be bent or deformed as the assemblies are lowered into engagement with them. To repair such a bent or deformed pin, it is necessary that the core plate support and the core barrel which it carries be removed from the pressure vessel, a formidable task particularly if the damage to a pin occurs after a number of fuel assemblies have been engaged with the core support plate.

It is an object of this invention to overcome the above-described difficulties and disadvantages of the prior art and to provide a positioning and alignment structure for the fuel assemblies of a nuclear reactor which shall be readily manufactured at lower cost than prior art structures and which shall not require removal of the core support plate from the pressure vessel in the event of damage during installation of fuel assemblies.

SUMMARY OF THE INVENTION

In the practice of this invention, each fuel assembly of a nuclear reactor is provided with pins which extend like legs downwardly from regions near the corners of its base or bottom, i.e., from the bottom nozzle. The bottom nozzle is a casting and the pins are cast as legs on the bottom nozzle. The pins are thus provided at relatively low cost. To form the core, the fuel assemblies are nested side-by-side, forming a matrix of regions defined by converging corners of contiguous fuel assemblies. A bundle or group of pins extends downwardly from each region. At the corners of the core this "group" consists of one pin. From each region of convergence along the periphery of the core, the group consists of two pins. Within the core, the group consists of as many pins as there are corners on each fuel assembly; i.e., four in the case of square or rectangular assemblies and three in the case of hexagonal assemblies. The pins subtending each convergence region are contiguous and they are so shaped that together they form a body having an external continuous curved surface. Typically the surface is a complete circular cylinder for regions within the core, semi-cylindrical or two-thirds cylindrical along the periphery of the core and quarter cylindrical or one-third cylindrical at the corners. The core support plate is provided with a matrix of holes each positioned and dimensioned to receive a group of pins with each continuous surface formed by the pins a snug but sliding fit in the hole which receives it. The fuel assemblies are thus firmly positioned, supported and aligned. In the case of corner or peripheral groups, the hole may be partly filled by an appropriate spacer, typically a half or one-third cylinder for the peripheral groups and a three-quarter or two-thirds cylinder for the corner groups. The spacer may, in some cases, be dispensed with a reliance placed on the support and alignment afforded by the two internal groups of pins of corner or peripheral assemblies which are within the core. In addition to its economic and manufacturing advantages, the support and alignment structure of this invention has the advantage that if a pin is bent or otherwise damaged, the core support plate need not be removed. The assembly having the damaged pin is withdrawn and the damage repaired.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which:

FIG. 7 is a fragmental plan view showing the nozzles of a plurality of the fuel assemblies which are nested to form the core of a nuclear reactor;

FIG. 9A is a fragmental plan view enlarged of a small section of the core support plate shown in FIG. 9;

FIG. 10 is a fragmental view in section taken along line X—X of FIG. 9;

FIG. 12 is a fragmental view in section taken along line XII—XII of FIG. 8; and

FIG. 13 is a fragmental diagrammatic view in transverse section showing the manner in which the pins of nested fuel assemblies of hexagonal transverse cross section are disposed.

DESCRIPTION OF THE PREFERRED EMBODIMENTS

Figure 1:
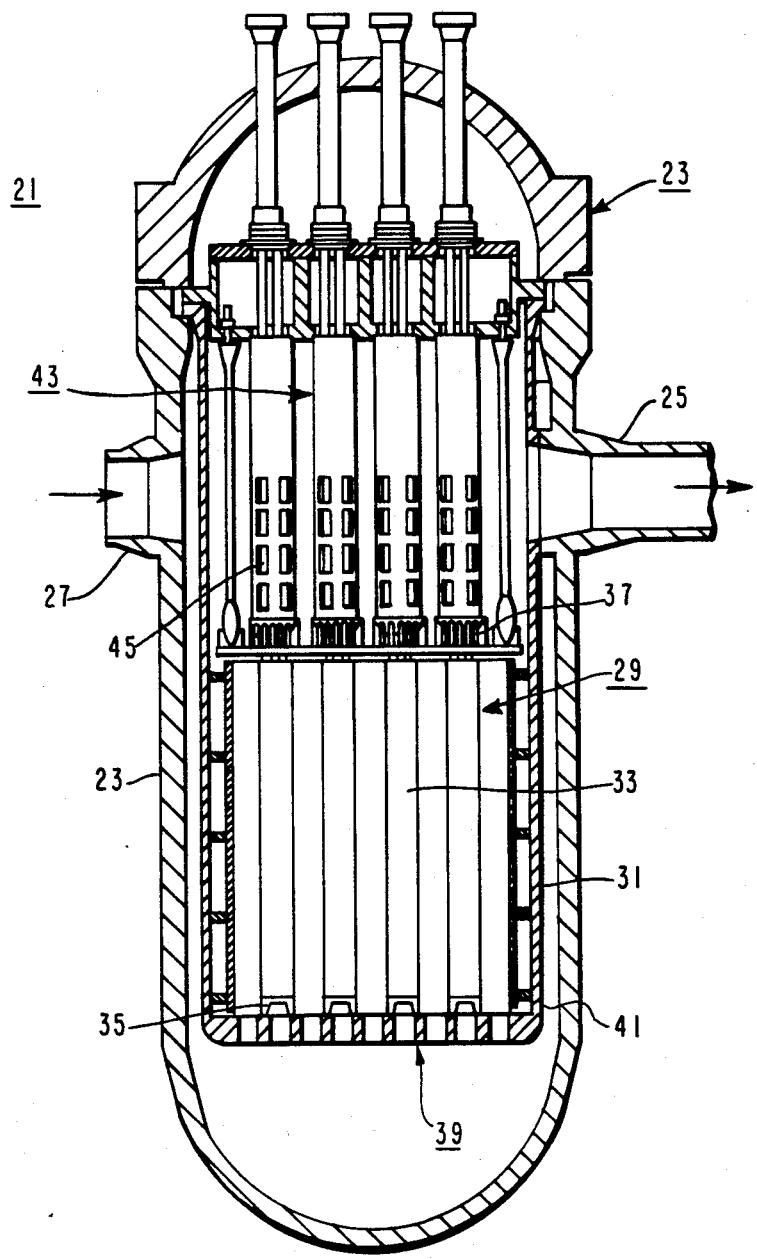
FIG. 1 is a view in longitudinal section, partly diagrammatic, showing a nuclear reactor embodying this invention.
Figure 2:
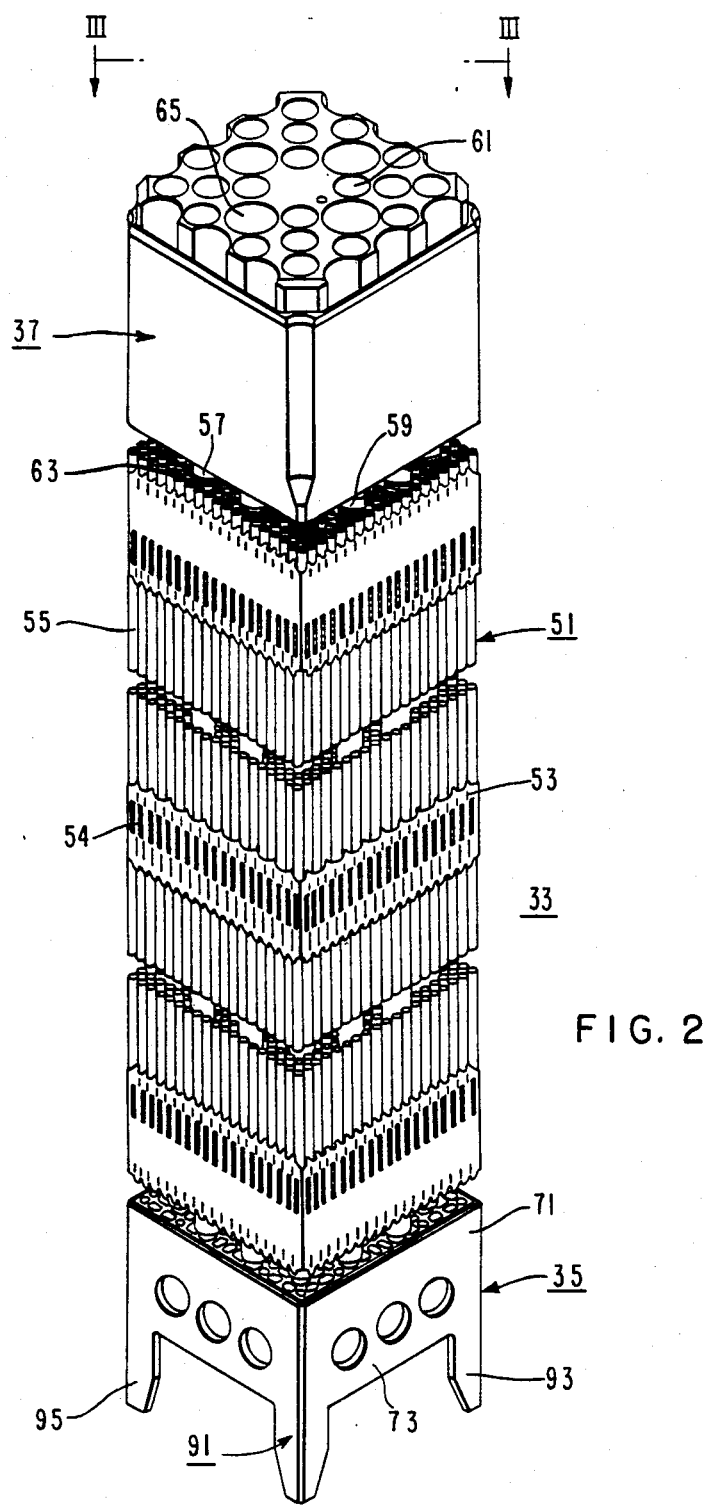
FIG. 2 is a view in isometric of a fuel assembly of a nuclear reactor in accordance with this invention.
Figure 11:
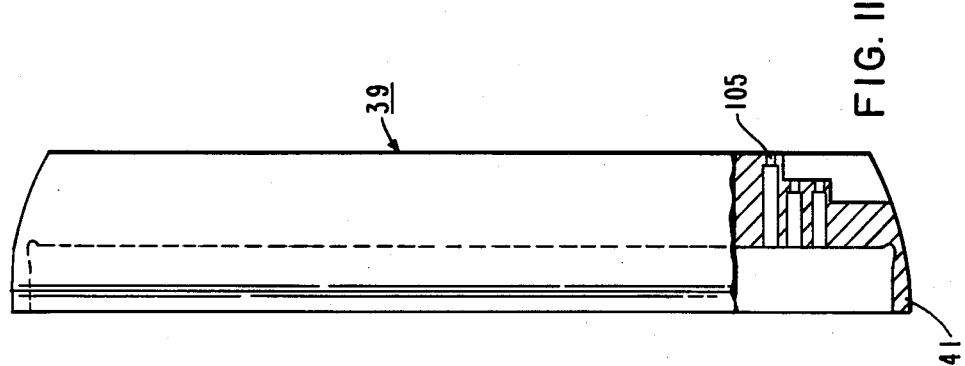
FIG. 11 is a view in side elevation and partly in section of the core support plate taken in the direction XI—XI of FIG. 9.
Figure 9:
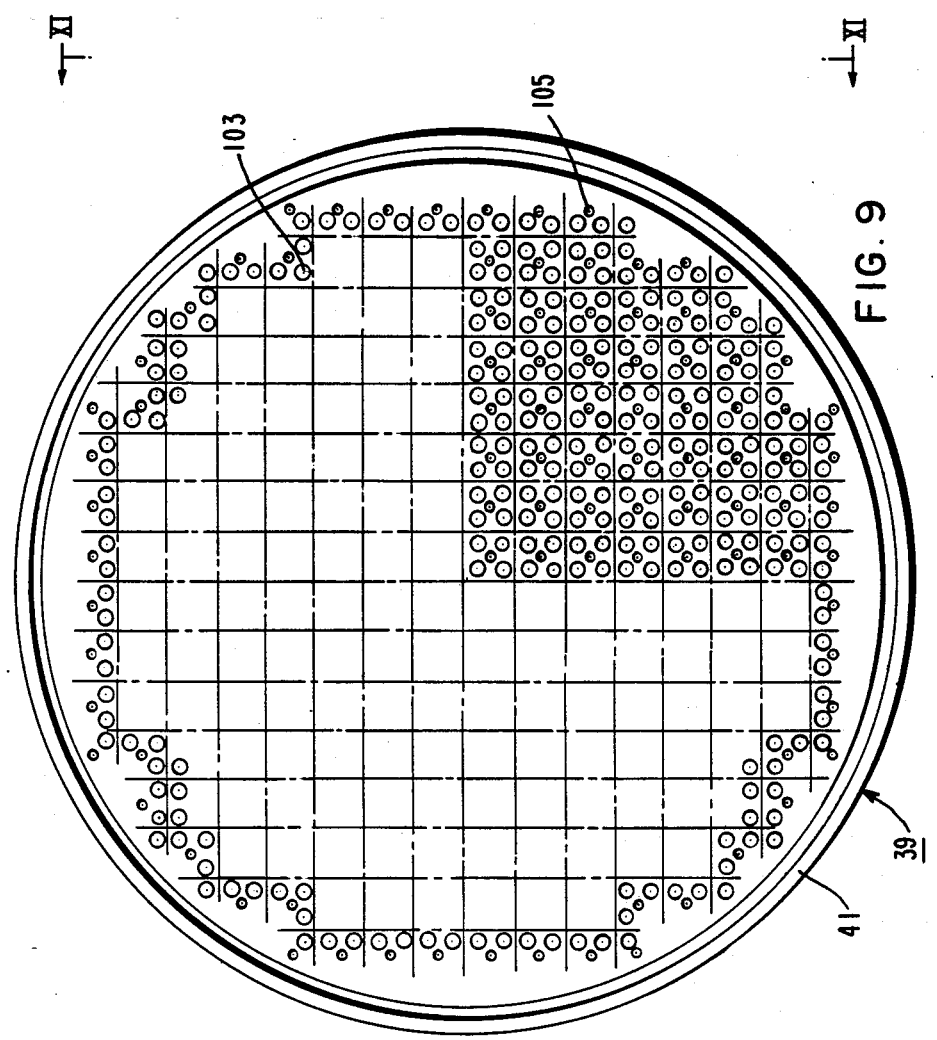
FIG. 9 is a plan view of the core support plate of a nuclear reactor in accordance with this invention.

The apparatus shown in the drawings is a nuclear reactor 21 (FIG. 1). See also application Ser. No. 490,099, filed Apr. 19, 1983 to Luciano Veronesi et al. for Nuclear Reactor and assigned to Westinghouse Electric Corporation. This reactor includes a circularly cylindrical pressure vessel 23 having a plurality of outlet nozzles 25 and a plurality of inlet nozzles 27 for the coolant (only one of each shown). Within the vessel there is a nuclear core 29 which includes a core barrel 31 within which there are a plurality of fuel assemblies 33 (FIG. 2). The fuel assemblies are mounted and secured between a bottom nozzle 35 and a top nozzle 37. The nozzles 35 and 37 should not be confused with the outlet and inlet nozzles 25 and 27. The nozzles 35 and 37 are essentially structural parts of the core 29. They are referred to as nozzles because they serve as inlet and outlet for the coolant which bathes the fuel assemblies 33. There are a plurality of fuel assemblies nested side-by-side to form an array 38 (FIG. 7). Where the fuel assemblies 33 are of square transverse cross section, there are typically 193 assemblies in an array. The core 29 is mounted on a core support plate 29 typically a circular disc (FIGS. 9, 11). A ring 41 (FIGS. 1, 9, 11) is welded around the periphery of the support plate 39 and the core barrel 31 is welded to the ring. Above the core 29 of the reactor 21 there are the upper internals 43 including guides 45 for the coolantdisplacement rods (not shown) and the control rods (not shown). The support plate 39 is perforated (FIG. 9) so that it conducts the coolant. The coolant flows in through the inlet nozzles 27, downwardly through the annulus between the core barrel 31 and wall of vessel 23, upwardly through the core support plate 39 and the bottom nozzle 35, bathing the fuel assemblies 33 and deriving heat energy from them and then out through the top nozzle 37, the upper internals 43 and the outlet nozzle 25.

Figure 3:
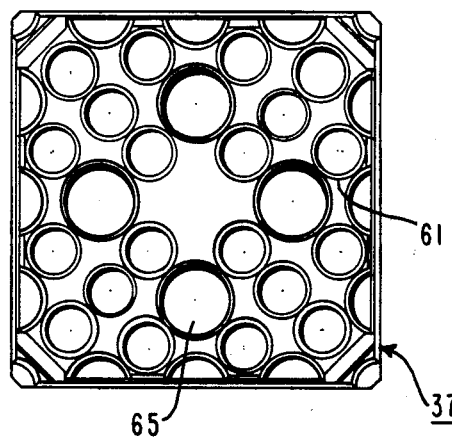
FIG. 3 is a plan view of this fuel assembly as seen in the direction III—III of FIG. 2.

Each assembly (FIGS. 2, 3) includes, in addition to the bottom nozzle 35 and top nozzle 37, a grid 51, similar to an egg crate, of interfitted or interlaced crossed slotted straps 53 defining vertical compartments. The straps are provided on one side with springs (not shown) and on the opposite side with projections 54 (see Andrews U.S. Pat. No. Re 28079). Fuel rods 55, coolant displacement rod thimbles 57 (FIG. 3) and control rod thimbles 59 are held and securely positioned within vertically coextensive compartments by the springs and the projections.

The top nozzle 37 is conventional and will not be described in detail. The top nozzle 37 includes guide tubes 61 which encircle the displacement rod and control rod thimbles 57 and 59 and are secured to the thimbles by bulge expansions 63. The top nozzle also includes flow holes 65 through which the coolant flows.

Figure 4:
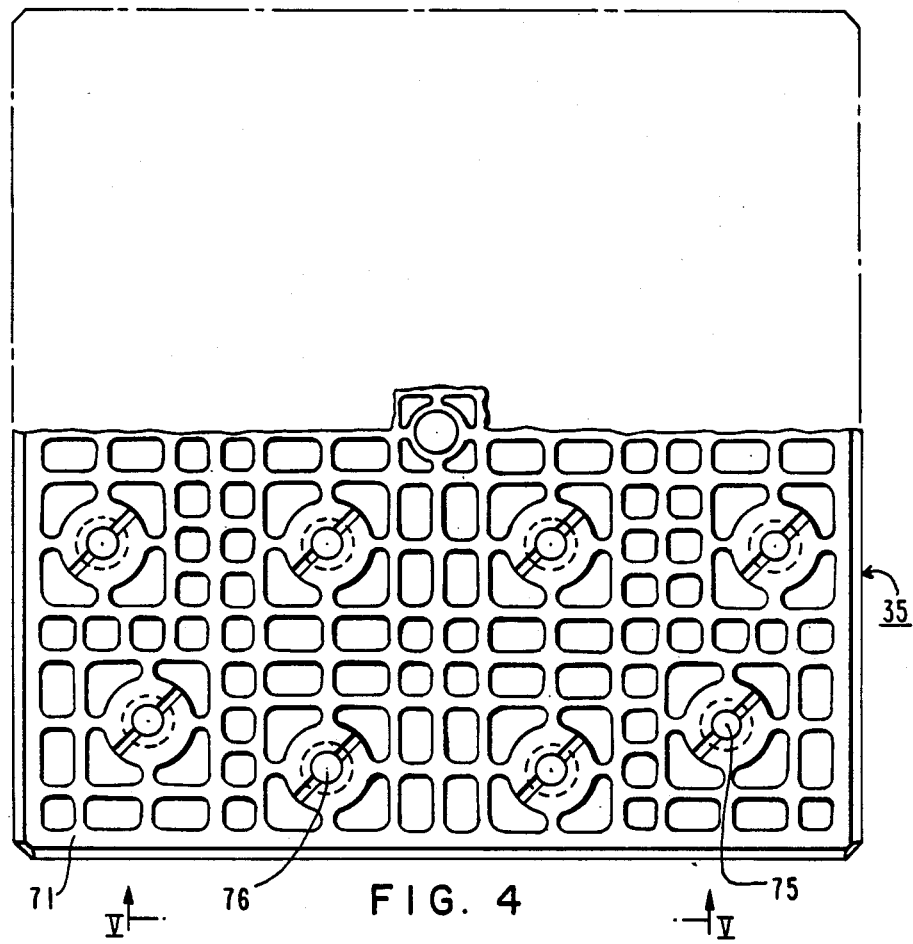
FIG. 4 is a plan view of the bottom nozzle of the fuel assembly shown in FIG. 2.
Figure 5:
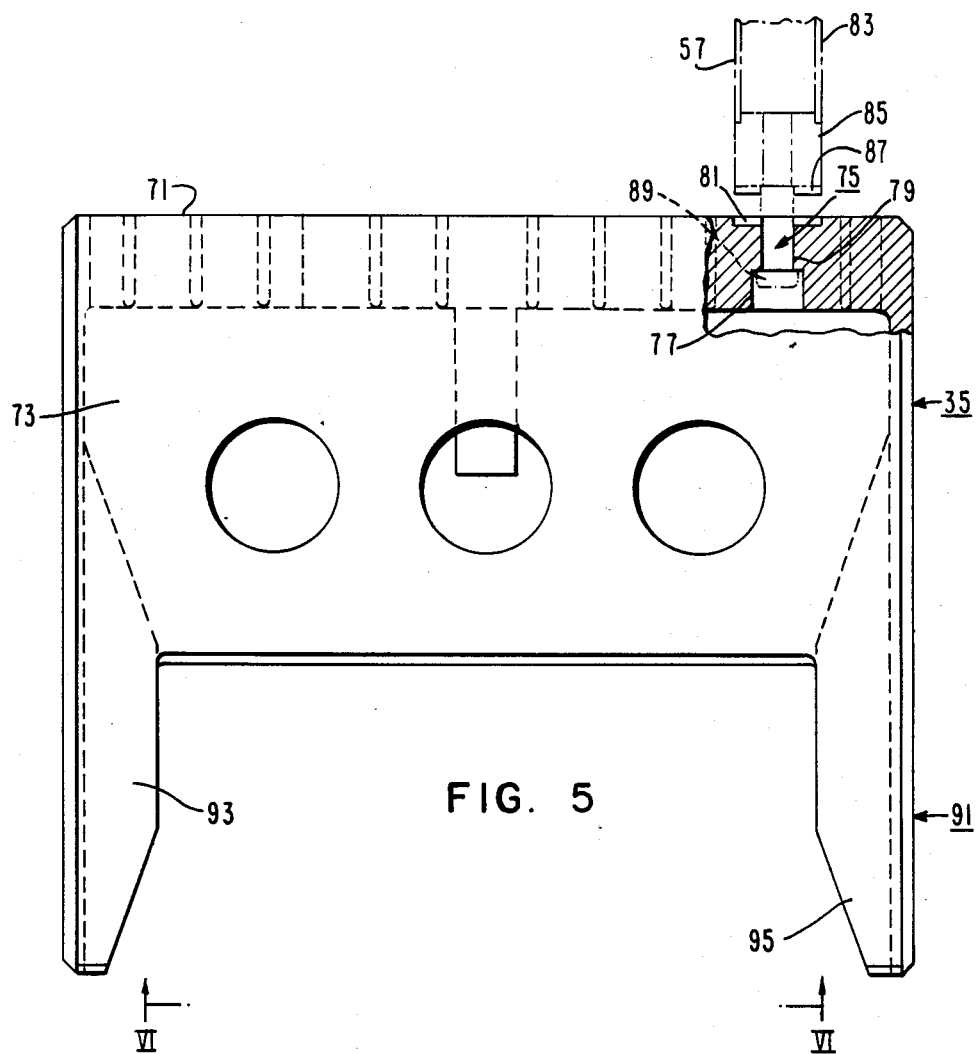
FIG. 5 is a view in side elevation of this bottom nozzle, as seen in the direction V—V of FIG. 4, with part in longitudinal section.
Figure 6:
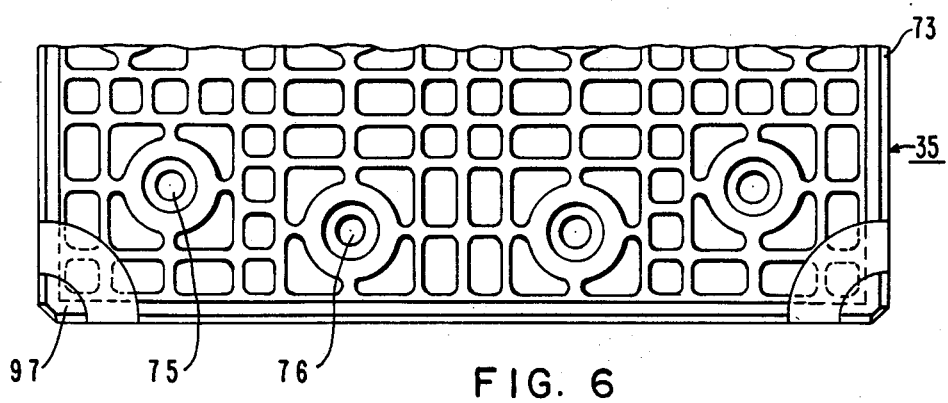
FIG. 6 is a fragmental bottom view of this nozzle as seen in the direction VI—VI of FIG. 5.
Figure 5A:
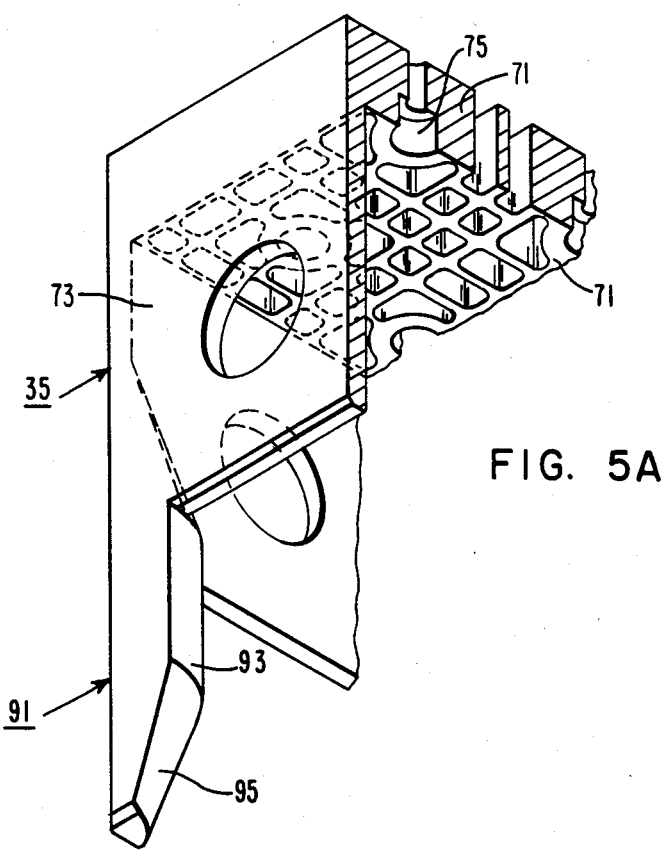
FIG. 5A is a fragmental view in isometric of the lower nozzle showing the pin structure.
Figure 8:
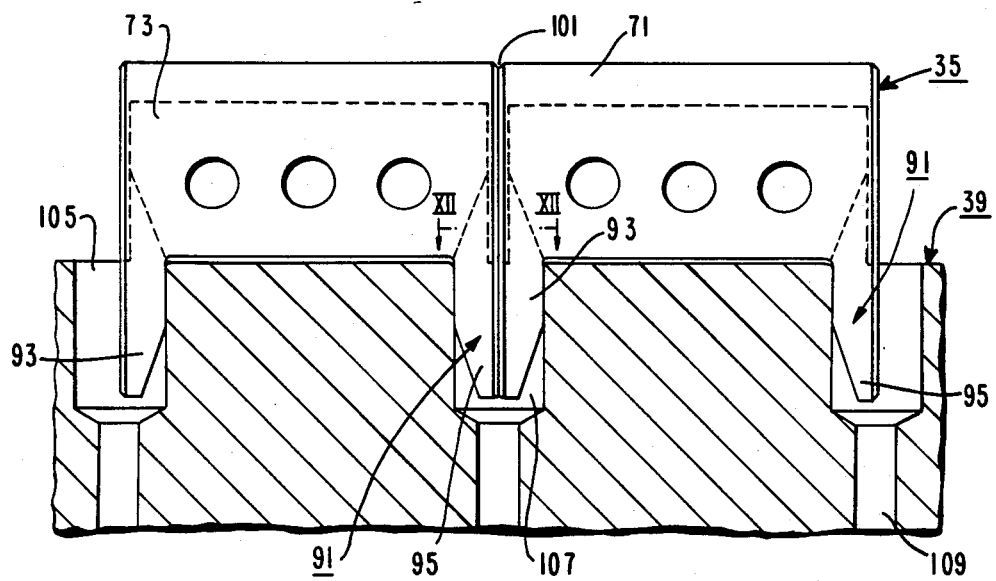
FIG. 8 is a view in section taken along line VIII—VIII of FIG. 7.

The bottom nozzle 35 is formed from a casting. It includes a top plate 71 from which a skirt 73 depends (FIGS. 4, 5). The top plate is perforated to conduct the coolant and in addition has a matrix of holes 75 and 76 within which the coolant displacement rod thimbles 57 and the control rod thimbles are secured. FIG. 5 shows the longitudinal cross section of a typical hole 75 for securing a displacement rod thimble 57. This hole 75 includes a lower shouldered part 77 which is joined to an attenuated upper part 79. At the top, slots 81 extend laterally from the hole 75. The thimble 57 (see broken line sketch in FIG. 5) includes a shell 83 which is joined, typically by welding, to an internally threaded head 85. The head 85 has projections 87 which engage the slots 81. The thimble 57 is secured to the head 85 by a screw 89 which engages the internal thread in the head and is locked against the shoulder. The control rod thimbles are similarly secured to the bottom nozzle 35.

Legs or pins 91 (FIG. 5) depend from the corners of the skirt 73. Each pin 91 consists of a solid cylindrical part 93 joined at the bottom by a solid conical part 95. The transverse cros section of pin 91 is essentially a sector of a circle extending over an arc of 90° which is of the same radius if the section is through part 93 and of progressively varying radius if the section is through part 95.

With the fuel assemblies 33 nested in the core 29 side-by-side, the internal corners of a plurality of contiguous fuel assemblies converge in a region 101 (FIG. 7). A group or bundle of pins 91 extend downwardly from each region 101. The pins 91 of each group abut so that the parts 93 of the pins which are of solid cylindrical cross section form approximately a continuous cylindrical external surface as shown, in transverse cross section, in FIG. 12. The word "approximately" is used advisedly above since to achieve the purposes of this invention there may be elongated gaps between contiguous pins of a bundle. Along the periphery of the array 101 of fuel assemblies 33, a semi-cylindrical surface is formed and at the corners there are only quarter cylindrical surfaces.

The core support plate 39 (FIGS. 9, 10, 11) includes flow-through holes 103 for the coolant and a matrix of holes 105 for receiving the bundles of pins 91 depending from the bottom nozzles 35. Each hole 105 has an upper shouldered portion 107 and an attenuated lower portion 109 (FIG. 10). The upper portion 107 is dimensioned to receive a bundle of pins 91. It is desirable that each bundle be slidable into the portion 107 but fit snuggly therein. Spacers may be provided for the peripheral and corner hoels 105. Coolant flows through the hole 105. The supporting and aligning structure in accordance with this invention effectively positions, supports and aligns the fuel assemblies 33.

Where the fuel assemblies 111 (FIG. 13) are hexagonal, the bundle or group of pins 113 at a region where the corners of fuel assemblies converge includes three pins. The transverse cross section of the cylindrical portion of each pin extends over an arc of 120° as shown in FIG. 13. Peripheral convergence regions include two pins extending over an arc of 240° and corner regions include only one pin extending over 120°.

While preferred embodiments of this invention have been disclosed herein, many modifications thereof are feasible. This invention should not be restricted except insofar as is necessitated by the spirit of the prior art.

I claim:

1. A nuclear reactor including a core having a plurality of fuel assemblies, each of generally polygonal transverse cross section, said assemblies being mutually nested side-by-side in an array, each of said fuel assemblies including a plurality of pins, each pin extending downwardly from a region near a corner of the bottom of said each fuel assembly, the pins extending from near the corners of a plurality of fuel assemblies whose corners converge forming a group of adjacent pins, said reactor also including a core support plate having holes, each of said group of adjacent pins extending into a said hole of said core support plate whereby said fuel assemblies are supported and aligned by said support plate.

2. The reactor of claim 1 wherein each fuel assembly includes a bottom nozzle having generally the polygonal transverse cross section of the assembly and the bottom nozzle includes the pins, the pins for each assembly extending downwardly from a region near a corner of the bottom nozzle of said each assembly and the pins extending from near the corners of a plurality of bottom nozzles whose corners converge forming the group of adjacent pins.

3. A nuclear reactor including a core having a plurality of fuel assemblies, each of generally polygonal transverse cross section, each of said assemblies being mutually nested side-by-side in an array, each of said fuel assemblies including a plurality of pins, each pin extending downwardly from a region near a corner of the bottom of said each fuel assembly, the pins extending from near the corners of a plurality of fuel assemblies whose corners converge in the region where said corners converge forming a group of adjacent pins, the pins of said group being positioned with their outer surfaces contiguous so that said outer surfaces together form a continuous surface, said reactor including a core support plate having holes, each of said holes being generally coaxial with a said continuous surface, and the boundary of each hole having the contour generally of at least a portion of said continuous surface, each group of pins extending into a hole with which their continuous surface is generally coaxial with the last-named continuous surface substantially being a snug, slidable fit in the boundary of the corresponding hole, whereby the said fuel assemblies are supported and aligned by said support plate.

4. The nuclear reactor of claim 3 wherein each fuel assembly is of generally rectangular transverse cross section and each hole in the support plate is bounded by a surface of generally circular section and the outer surface of each pin of a group is a section of a circular cylinder extending over an arc of about 90°, so that the continuous surface formed by each group of pins is a circular cylinder or an arc of a circular cylinder dependent upon the number of pins in the group.

5. The nuclear reactor of claim 3 wherein each of the fuel assemblies is of generally hexagonal transverse cross section and each hole in the support plate is bounded by a surface of generally circular transverse cross section and the outer surface of each pin of a group is a section of a circular cylinder extending over an arc of about 120°, so that the continuous surface formed by each group of pins is a circular cylinder or an arc of a circular cylinder dependent upon the number of pins in the group.

6. The nuclear reactor of claim 2 wherein each bottom nozzle is a casting, the pins being cast as legs on the bottom nozzle.

* * * * *